US009496936B2

(12) United States Patent
Blatz

(10) Patent No.: US 9,496,936 B2
(45) Date of Patent: Nov. 15, 2016

(54) SECURE CONTACTLESS DATA COMMUNICATION

(75) Inventor: Werner Blatz, Leingarten (DE)

(73) Assignee: Atmel Corporation, San Jose, CA (US)

( * ) Notice: Subject to any disclaimer, the term of this patent is extended or adjusted under 35 U.S.C. 154(b) by 244 days.

(21) Appl. No.: 13/231,611

(22) Filed: Sep. 13, 2011

(65) Prior Publication Data

US 2013/0063247 A1    Mar. 14, 2013

(51) Int. Cl.
| | |
|---|---|
| *G06F 7/04* | (2006.01) |
| *H04B 7/06* | (2006.01) |
| *G07C 9/00* | (2006.01) |
| *H04B 7/08* | (2006.01) |

(52) U.S. Cl.
CPC ......... *H04B 7/0604* (2013.01); *G07C 9/00309* (2013.01); *G07C 2009/00555* (2013.01); *G07C 2009/00793* (2013.01); *H04B 7/0837* (2013.01)

(58) Field of Classification Search
CPC ............ B60R 25/246; G07C 9/00007; G07C 9/00111; G07C 9/00309; G07C 2009/00555; G07C 2009/00793; H01Q 1/22; H01Q 1/2216; H01Q 1/3233; H01Q 1/3266; H01Q 1/3275; H01Q 1/3283; H01Q 1/3291; H01Q 7/00; H01Q 21/28; H01Q 21/29; H04B 7/0602; H04B 7/0604; H04B 7/0613; H04B 7/0686; H04B 7/0689; H04B 7/0837; H04L 9/3271
USPC ................ 340/425.5, 426.1, 426.11, 426.13, 340/426.14, 426.16, 426.17, 426.36, 505, 340/5.1, 5.2, 5.21, 5.31, 5.6, 5.61, 5.64, 5.7, 340/5.72, 5.8, 10.1
See application file for complete search history.

(56) References Cited

U.S. PATENT DOCUMENTS

| | | | |
|---|---|---|---|
| 6,970,679 B2 | 11/2005 | Blatz et al. | |
| 7,705,710 B2 * | 4/2010 | Hermann | ................ B60R 25/24 340/426.11 |
| 2002/0033752 A1 * | 3/2002 | Greenwood | .......... B60R 25/246 340/5.61 |
| 2003/0043023 A1 * | 3/2003 | Perraud | ................ G06K 7/0008 340/10.1 |
| 2006/0164207 A1 * | 7/2006 | Wilcox | .................... B60R 25/24 340/5.61 |
| 2012/0229254 A1 * | 9/2012 | Nowottnick | ....... G07C 9/00309 340/5.61 |

* cited by examiner

*Primary Examiner* — Brian Wilson
(74) *Attorney, Agent, or Firm* — Fish & Richardson P.C.

(57) ABSTRACT

In one embodiment, a method includes receiving, at a first device, a first signal transmitted from a first antenna and receiving a second signal after receiving the first signal. The second signal is transmitted from a second antenna after the first signal was transmitted from the first antenna. The method includes determining expected characteristics of an expected signal based on combining the first signal and the second signal. The method includes receiving, at the first device, a third signal comprising signals transmitted from the first antenna and the second antenna substantially simultaneously. The method includes determining whether the third signal comprises at least one characteristic that matches the expected characteristics. In response to determining that the third signal matches the expected signal, the method includes engaging, by the first device, in a communication session with a second device, the second device comprising the first antenna and the second antenna.

39 Claims, 3 Drawing Sheets

SECURE CONTACTLESS DATA COMMUNICATION

BACKGROUND

Contactless data communication has been employed in multiple industries, including the automotive industry. There, contactless data communication is used to gain access to a vehicle. A key or key fob is held by a person and is operable to communicate with a vehicle when the key fob is within range of wireless communication with the vehicle. The person may press a button on the vehicle or lift the handle of a door of the vehicle to initiate communication between the vehicle and the key or key fob. Once communication is initiated, the vehicle and the key or key fob may exchange messages to allow the person access to the vehicle. For example, the key or key fob may transmit one or more authentication messages that the vehicle validates.

One problem that has arisen with contactless data communication is that it is susceptible to a relay attack. In the context of access to vehicles, this attack includes a person initiating the communication with the vehicle by pushing a button on the vehicle or lifting a handle on the vehicle's door. The vehicle then transmits a signal which is captured by the person and relayed to a remote device using a transceiver. The remote device may be located away from the vehicle but in proximity to the key or key fob. For example, the vehicle may be in a parking lot of a restaurant and the owner of the vehicle may be in the restaurant. The remote device may be located inside the restaurant and may relay the signal transmitted by the vehicle in the restaurant. The key fob, while in the possession of the owner, may receive the signal transmitted by the vehicle as a result of the remote device and may respond with authentication signals. The remote device may capture the authentication signals and transmit them to the person in proximity with the vehicle who initiated the communication. The transceiver held by the person may transmit the authentication signals to the vehicle and the vehicle may validate the authentication signals. This may allow an unauthorized person access to the vehicle.

SUMMARY

In one embodiment, a method includes receiving, at a first device, a first signal transmitted from a first antenna and receiving a second signal after receiving the first signal. The second signal is transmitted from a second antenna after the first signal was transmitted from the first antenna. The method includes determining expected characteristics of an expected signal based on combining the first signal and the second signal. The method includes receiving, at the first device, a third signal comprising signals transmitted from the first antenna and the second antenna substantially simultaneously. The method includes determining whether the third signal comprises at least one characteristic that matches the expected characteristics. In response to determining that the third signal matches the expected signal, the method includes engaging, by the first device, in a communication session with a second device, the second device comprising the first antenna and the second antenna.

In some embodiments, the expected characteristics may comprise one or more of: an expected amplitude, an expected frequency, an expected phase, and an expected angle. The first signal may be different than the second signal. The second device may be a vehicle.

In one embodiment, a system includes at least one antenna configured to receive a first signal transmitted from a first antenna. The at least one antenna is also configured to receive a second signal after receiving the first signal. The second signal is transmitted from a second antenna after the first signal was transmitted from the first antenna. The at least one antenna is also configured to receive a third signal. The third signal comprises signals transmitted from the first antenna and the second antenna substantially simultaneously. The system also includes at least one processor configured to determine expected characteristics of an expected signal based on combining the first signal and the second signal and determine whether the third signal comprises at least one characteristic that matches the expected characteristics. In response to determining that the third signal matches the expected signal, the at least one processor is configured to engage in a communication session with a first device, the first device comprising the first antenna and the second antenna.

Depending on the specific features implemented, particular embodiments may exhibit some, none, or all of the following technical advantages. The presence of a relay attack in a contactless data communication session may be detected. Communicating with the ability to detect a relay attack may be performed without need for a high amount of data storage or computing power. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
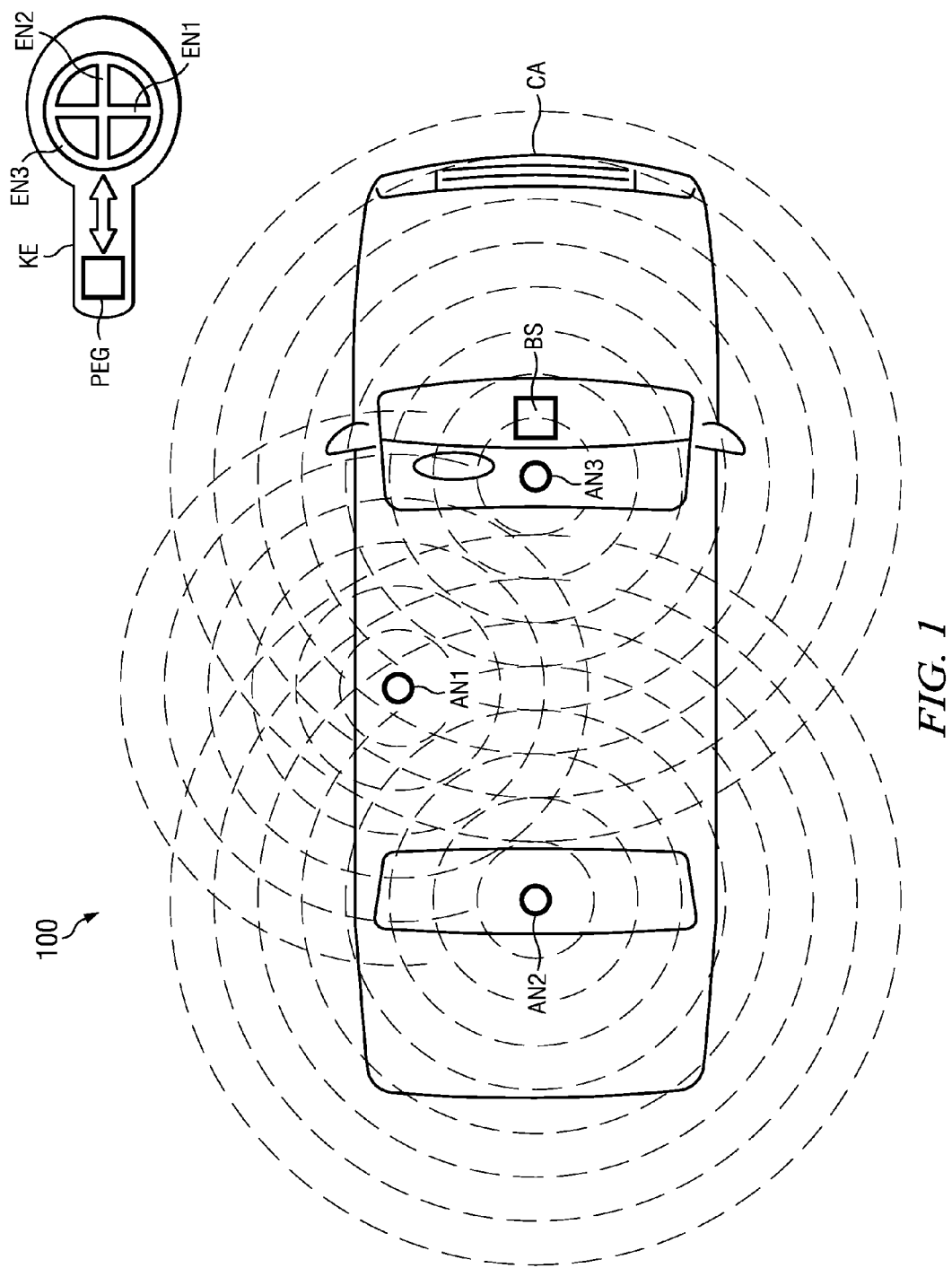
FIG. 1 illustrates one embodiment of a system for secure contactless data communication.

FIG. 1 illustrates one embodiment of system 100 for secure contactless data communication. A base station BS is located in a motor vehicle CA. The base station BS is coupled to antennas AN1, AN2 and AN3 arranged spatially separated from each other in or on the motor vehicle CA. Passive Entry/Go module PEG is installed or integrated in a key fob or key KE. As examples, key KE may be configured to unlock and operate the motor vehicle CA. The Passive Entry/Go module PEG comprises or is connected to three antennas EN1, EN2 and EN3. Antenna EN3 may be an annular ring-shaped antenna. Antennas EN1 and EN2 may be rod-shaped antennas and arranged such that they cross one another in the plane of the annular ring-shaped antenna EN3. In this manner, the effective axes of antennas EN1, EN2 and EN3 are oriented orthogonally relative to each other, while all three antennas are physically arranged lying in a single plane.

In some embodiments, data transmissions are to be carried out between base station BS and Passive Entry/Go module PEG. For example, a transmission from base station BS to Passive Entry/Go module PEG may be in the low frequency (LF) band at, e.g., 125 kHz by inductive coupling in the electromagnetic near field. In some embodiments, the low frequency (LF) band may be between 30 kHz to 300 kHz. As another example, a transmission from Passive Entry/Go module PEG to base station BS may take place at frequencies in the megahertz range (e.g., 315 MHz). The data transmissions may be used to carry out an authentication and data communication process. Base station BS radiates or transmits the electromagnetic field sequentially in succession from two or more of antennas AN1, AN2 and AN3. Antennas EN1, EN2 and EN3 of Passive Entry/Go module PEG may be located in the near field of antennas AN1, AN2 and AN3.

In Passive Entry/Go module PEG, using antennas EN1, EN2 and EN3, the orthogonal components of the field strength vectors associated with antennas AN1, AN2, and AN3 are determined. Passive Entry/Go module PEG may determine an expected signal using the received field strength vectors. For example, if Passive Entry/Go module PEG received a first signal transmitted from antenna AN1 and then, after receiving the first signal, a second signal transmitted from antenna AN2, Passive Entry/Go module PEG may determine the expected signal by summing the field strength vectors associated with the signals transmitted from antennas AN1 and AN2. The determined expected signal represents a signal expected to be received by Passive Entry/Go module PEG when antenna AN1 transmits the first signal and antenna AN2 transmits the second signal at the same time.

In some embodiments, the components of the magnetic field strength vectors associated with signals transmitted by antennas AN1, AN2, and AN3 are transmitted back from Passive Entry/Go module PEG to base station BS. Transmission of the values of the individual components back to the base station BS from the Passive Entry/Go module PEG may be performed by modulating the values at frequencies in the megahertz range (e.g., 315 MHz) onto a reply or response signal as digital data in an encoded form. Base station BS may determine an expected signal using the received components of the field strength vectors instead of Passive Entry/Go module PEG. For example, Passive Entry/Go module PEG may have received a first signal transmitted from antenna AN1 and then, after receiving the first signal, Passive Entry/Go module PEG may have received a second signal transmitted from antenna AN2. The components of the magnetic field strength vectors associated with the first and second signals may be transmitted from Passive Entry/Go module PEG to base station BS. Base station BS may determine the expected signal by summing the field strength vectors associated with the signals transmitted from antennas AN1 and AN2. The determined expected signal represents a signal expected to be received by Passive Entry/Go module PEG when antenna AN1 transmits the first signal and antenna AN2 transmits the second signal at the same time.

In some embodiments, it may be advantageous to determine the expected signal at the base station BS because it may reduce the complexity of an integrated circuit of the Passive Entry/Go module PEG as well as the power consumption of the Passive Entry/Go module PEG, which is beneficial when the Passive Entry/Go module PEG is to be embodied in a key KE that may be small or the like.

Signals may be transmitted from two or more of antennas AN1, AN2, and AN3 simultaneously after two or more of antennas AN1, AN2, and AN3 have transmitted the sequential signals discussed above used to determine the expected signal. The signal received by Passive Entry/Go module PEG corresponding to the signals transmitted from two or more of antennas AN1, AN2, and AN3 simultaneously may be compared to the expected signal determined above. If the signals transmitted simultaneously are validated (e.g., a match is determined between one or more characteristics of the signals transmitted simultaneously and characteristics of the signals transmitted sequentially), then key KE may continue communication with car CA. For example, key KE may transmit signals that include authentication information which car CA may validate. If car CA validates the authentication information, access may be granted to car CA, such as unlocking doors of car CA or starting car CA. In some embodiments, this may provide an advantage in that a relay attack may be detected.

Figure 2:
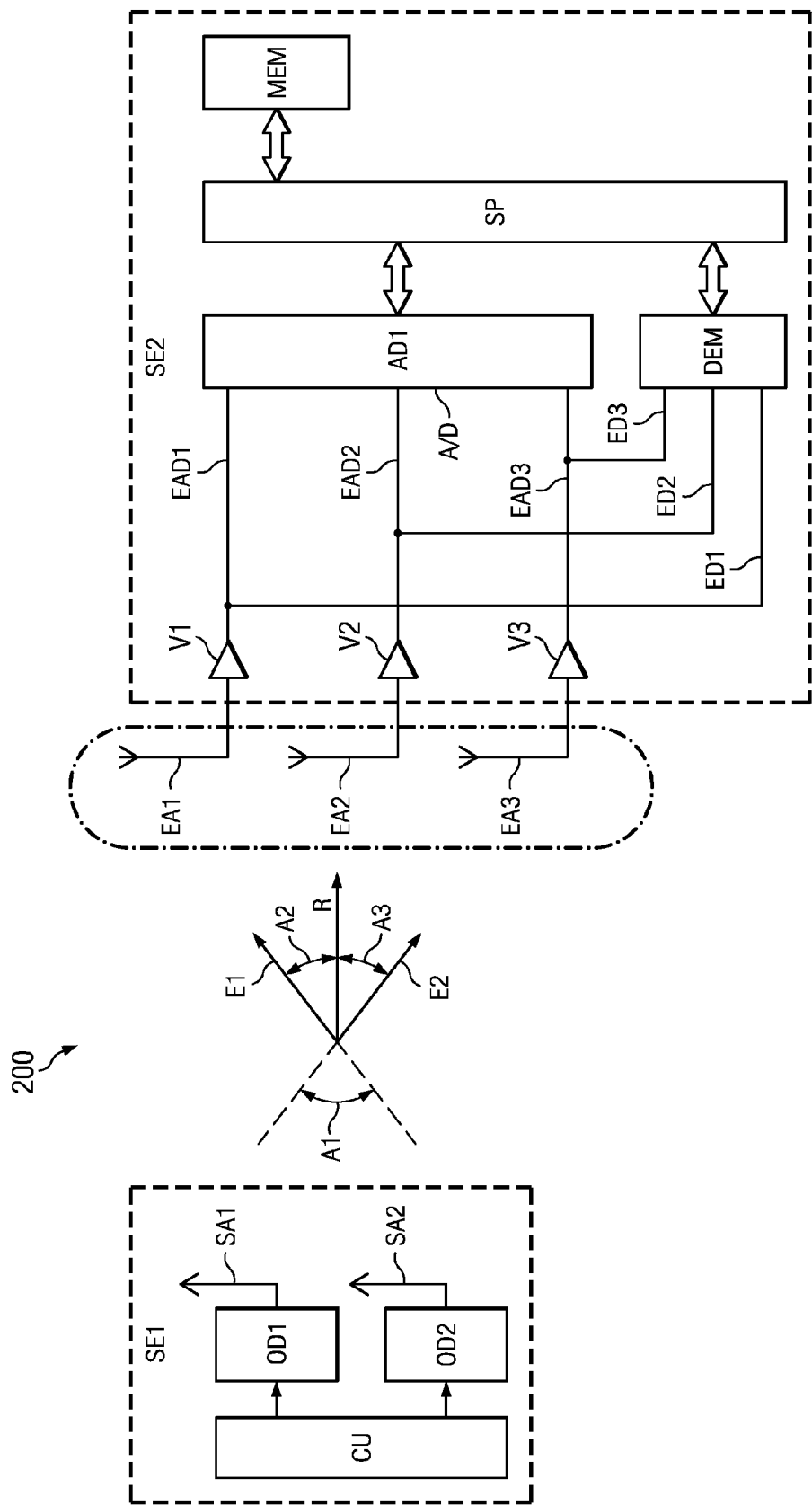
FIG. 2 illustrates one embodiment of components in a system for secure contactless data communication.

FIG. 2 illustrates one embodiment of components used in system 200 for secure contactless data communication. Components discussed in system 200 may be used to implement aspects of system 100 of FIG. 1. System 200 includes transceiver SE1 and transceiver SE2. In some embodiments, a data exchange or communication may occur by transmitting a data-carrying modulated electromagnetic field between the transceiver SE1 and transceiver SE2. The transceiver SE1 comprises a control unit CU. The control unit CU is coupled to a first output driver OD1 and to a second output driver OD2. A first transmitting antenna SA1 is coupled to the first output driver OD1, and a second transmitting antenna SA2 is coupled to the second output driver OD2.

In some embodiments, transceiver SE2 comprises three antennas EA1, EA2 and EA3 that are oriented orthogonally relative to each other. Receiving antennas EA1, EA2 and EA3 are connected to signal amplifiers V1, V2 and V3, respectively. Signal amplifiers V1, V2 and V3 are coupled to inputs EAD1, EAD2 and EAD3 of an A/D converter AD1, respectively. Furthermore, each input EAD1, EAD2 and EAD3 of the A/D converter AD1 is connected with input ED1, ED2 and ED3 of a demodulator DEM, respectively. In this manner, the signal received by each one of the receiving antennas EA1, EA2 and EA3 can be individually demodulated to obtain and evaluate the data being carried by the modulated signal as received by each of the receiving antennas. The A/D converter AD1 and the demodulator DEM are also each respectively connected with a signal processor SP, which in turn is further connected with a memory unit MEM. In some embodiments, elements similar to A/D converter AD1, demodulator DEM, signal processor SP, and memory unit MEM may be included in transceiver SE1.

In some embodiments, signal processor SP includes hardware for executing instructions, such as those making up a computer program. As an example and not by way of limitation, to execute instructions, signal processor SP may retrieve (or fetch) the instructions from an internal register, an internal cache, memory unit MEM, or storage; decode and execute them; and then write one or more results to an internal register, an internal cache, memory unit MEM, or storage. In particular embodiments, signal processor SP may include one or more internal caches for data, instructions, or addresses. This disclosure contemplates signal processor SP including any suitable number of any suitable internal caches, where appropriate. As an example and not by way of limitation, signal processor SP may include one or more instruction caches, one or more data caches, and one or more translation lookaside buffers (TLBs). Instructions in the instruction caches may be copies of instructions in memory unit MEM or storage, and the instruction caches may speed up retrieval of those instructions by signal processor SP. Data in the data caches may be copies of data in memory unit MEM or storage for instructions executing at signal processor SP to operate on; the results of previous instructions executed at signal processor SP for access by subsequent instructions executing at signal processor SP or for writing to memory unit MEM or storage; or other suitable data. The data caches may speed up read or write operations by signal processor SP. The TLBs may speed up virtual-address translation for signal processor SP. In particular embodiments, signal processor SP may include one or more internal registers for data, instructions, or addresses. This disclosure contemplates signal processor SP including any suitable number of any suitable internal registers, where appropriate. Where appropriate, signal processor SP may include one or more arithmetic logic units (ALUs); be a multi-core processor; or include one or more signal processors SP. Although this disclosure describes and illustrates a particular processor, this disclosure contemplates any suitable processor.

In some embodiments, memory unit MEM includes main memory for storing instructions for signal processor SP to execute or data for signal processor SP to on which to operate. As an example and not by way of limitation, signal processor SP may load instructions from memory unit MEM to an internal register or internal cache. To execute the instructions, signal processor SP may retrieve the instructions from the internal register or internal cache and decode them. During or after execution of the instructions, signal processor SP may write one or more results (which may be intermediate or final results) to the internal register or internal cache. Signal processor SP may then write one or more of those results to memory unit MEM. In particular embodiments, signal processor SP executes only instructions in one or more internal registers or internal caches or in memory unit MEM and operates only on data in one or more internal registers or internal caches or in memory unit MEM. One or more memory buses (which may each include an address bus and a data bus) may couple signal processor SP to memory unit MEM. In particular embodiments, one or more memory management units (MMUs) may reside between signal processor SP and memory unit MEM and facilitate accesses to memory unit MEM requested by signal processor SP. In particular embodiments, memory unit MEM includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory unit MEM may include one or more memory units MEM, where appropriate. Although this disclosure describes and illustrates particular memory, this disclosure contemplates any suitable memory.

In particular embodiments, memory units MEM includes mass storage for data or instructions. As an example and not by way of limitation, memory units MEM may include an HDD, a floppy disk drive, flash memory, an optical disc, a magneto-optical disc, magnetic tape, or a Universal Serial Bus (USB) drive or a combination of two or more of these. Memory units MEM may include removable or non-removable (or fixed) media, where appropriate. In particular embodiments, memory units MEM is non-volatile, solid-state memory. In particular embodiments, memory units MEM includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates memory units MEM taking any suitable physical form. Memory units MEM may include one or more storage control units facilitating communication between signal processor SP and memory units MEM, where appropriate.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of signal processor SP (such as, for example, one or more internal registers or caches), one or more portions of memory unit MEM, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language, machine code, or hardware description language. In particular embodiments, software is expressed in JAVA. In particular embodiments, software is expressed in
Hyper Text Markup Language (HTML), Extensible Markup Language (XML), or other suitable markup language.

In some embodiments, transceiver SE1 transmits an electromagnetic signal (e.g., in the low frequency (LF) band, such as 125 kHz) as an electromagnetic field E1 (represented as a field strength vector in FIG. 2) using the first transmitting antenna SA1, and then (sequentially thereafter), transmits an electromagnetic field E2 (e.g., in the low frequency (LF) band, such as 125 kHz) (represented as a field strength vector in FIG. 2) using the second transmitting antenna SA2. The amplitude of the electromagnetic field E1 transmitted via the first transmitting antenna SA1 may be the same or similar to the amplitude of the electromagnetic field E2 transmitted via the second transmitting antenna SA2.

Using the three receiving antennas EA1, EA2 and EA3 of transceiver SE2, the respective three orthogonal components of the field strength of the field E1 received from the first transmitting antenna SA1 are determined. The three components of the field strength vector E1 are individually converted into digital signals in the A/D converter AD1 and the corresponding digital signals are provided to the signal processor SP. In a similar manner, the three components of the field strength vector E2 as received by the three receiving antennas EA1, EA2 and EA3 are digitized through the A/D converter AD1 and provided to and processed in the signal processor SP. In some embodiments, signal processor SP may use the digitized information regarding field strength vectors E1 and E2 to determine information such as angles A1, A2, and A3. Signal processor SP may also determine resultant vector R by summing field strength vectors E1 and E2. Such information may be stored in memory MEM.

In some embodiments, the operations discussed above with respect to FIG. 1 may be performed using some or all of the components of FIG. 2. For example, base station BS and antennas AN1, AN2, and AN3 may be implemented using transceiver SE1. As another example, key KE, antennas EN1, EN2, and EN3, and Passive Entry/Go module PEG may be implemented using transceiver SE2.

In some embodiments, an advantage realized through system 200 may be that unauthorized extending of the communication path or link via a relay transceiver or the like can be detected in a reliable manner by transmitting multiple signals in a sequence followed by transmitting the same signals simultaneously. The calculated value(s) from the received signals from the signals transmitted in succession may be compared to the received signal(s) from the signals transmitted simultaneously to determine whether there is a match.

In some embodiments, the security against a redirection or relaying attack can be further increased by multiple iterations of the techniques discussed above. For example, the security can be increased by using more than two antennas in the techniques discussed above.

Another example advantage that may be present in some embodiments is that detecting a relay attack may be performed without using a high amount of storage or processing power. For example, in some embodiments, U.S. Pat. No. 6,970,679 discloses a manner of detecting a relay attack that uses more storage and/or processing power than the present disclosure.

Figure 3:
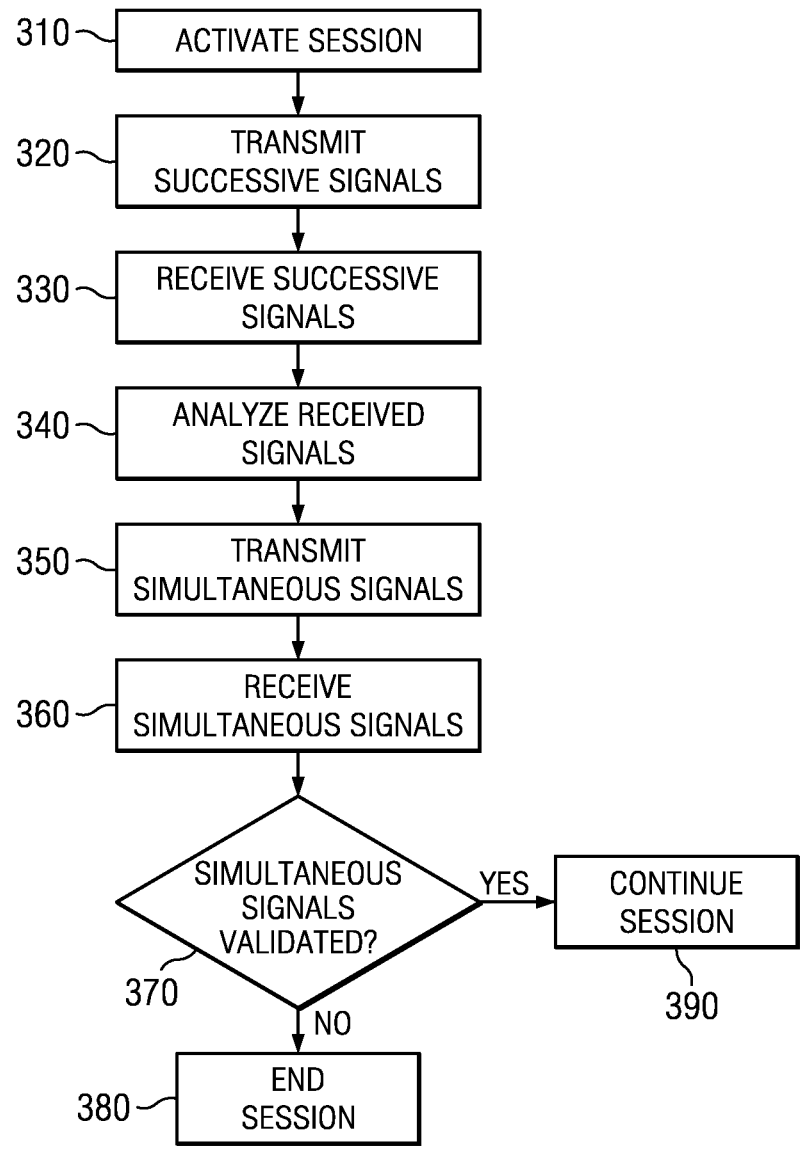
FIG. 3 is a flowchart illustrating one embodiment of secure contactless data communication.

FIG. 3 is a flowchart illustrating one embodiment of secure contactless data communication. In general, the steps illustrated in FIG. 3 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-2.

At step 310, in some embodiments, a communication session may be activated. For example, a communication session between car CA and key KE of FIG. 1 may be activated at this step. This may occur, in some embodiments, due to the proximity of the key KE to the car CA, or due to actions performed on car CA (such as pressing a button on car CA or lifting a handle of a door on car CA). Activating the session at this step may initiate a contactless data communication session. For example, it may cause car CA to begin an authentication communication session to determine whether or not to grant access to car CA or to feature(s) provided by car CA. In some embodiments, the communication session activated at this step may be for the purpose of performing functions such as turning on car CA, starting the engine, turning on or off lights, determining diagnostic information, accessing the trunk or other compartments of car CA, or other suitable functions.

At step 320, in some embodiments, successive signals may be transmitted. For example, after the activation in step 310, car CA may transmit a first signal from antenna AN1 and then subsequently a second signal from antenna AN2 of FIG. 1. As another example, more than two signals may be transmitted successively, such as sending a first signal from AN1 a second signal from AN2 and a third signal from antenna AN3. The multiple signals sent from multiple antennas at this step may be the same, substantially the same, or different. For example, the multiple signals sent at this step may differ in amplitude, phase, or frequency.

At step 330, in some embodiments, the successive signals transmitted at step 320 may be received. For example, if at step 320 antennas AN1 and AN2 each transmitted a signal, then at step 330 key KE may receive the signals. Antennas EN1, EN2, and EN3 of key KE may be used in receiving the signals transmitted at step 220.

At step 340, in some embodiments, signals received at step 330 may be analyzed. For example, the orthogonal components corresponding to the X, Y, and Z axes may be determined at step 340. As another example, angles between the signals transmitted at step 320 and received at step 330 may be determined. For example, if signals E1 and E2 of FIG. 2 were transmitted at step 320, angles A1, A2, and A3, may be determined at step 340. An expected signal may be determined at this step. For example, the expected signal may be the sum of the signals received at step 330. In some embodiments, signals E1 and E2 of FIG. 2 may be summed at this step to determine signal R of FIG. 2. At this step, properties of the signals transmitted at step 320 may be determined such as the amplitude, phase, and frequency of the transmitted signals. The analysis performed at this step may be performed by components illustrated in FIG. 2. For example, antennas EA1, EA2, and EA3 may be used to determine the orthogonal components of signals transmitted at step 320. Signal processor SP and memory unit MEM of FIG. 2 may be used to determine information regarding signals transmitted at step 320 such as angles A1, A2, A3 of FIG. 2 and characteristics of signals transmitted at step 320 such as amplitude, phase, and frequency. In various embodiments the analysis described at this step may be performed at key KE or at car CA of FIG. 1. For example, the signals received at step 330 may be received by key KE and analyzed by key KE. As another example, the signals transmitted at step 320 may be received by key KE and then copies of the received signals may be sent to car CA to perform the analysis described above. In some embodiments, information determined at step 340 may be stored (e.g., in memory unit MEM).

At step 350, in some embodiments, multiple antennas may transmit signals at the same time. The signals transmitted at step 320 may be retransmitted from the antennas all at the same time. For example, if antennas AN1 and AN2 transmitted successive signals at step 320 those same signals may be transmitted by antennas AN1 and AN2 at the same time instead of being transmitted successively as discussed in step 320. The signals transmitted at this step may have different amplitudes, phases, and/or frequencies from each other.

At step 360, in some embodiments, the signals transmitted at step 350 may be received. For example, the signals transmitted simultaneously at step 350 may have been transmitted by antennas AN1, AN2, and/or AN3 of FIG. 1 and may be received by key KE. As received, there may only be one signal as opposed to three separate signals since the signals were submitted simultaneously at step 350. For example, the signals may be combined over the air and received as one signal at step 360. The signals may be received by components such as antennas EN1, EN2, and EN3 of FIG. 1.

At step 370, in some embodiments, it may be determined whether the signal received at step 360 is validated. At this step, as an example, it may be determined whether the signals transmitted simultaneously correspond to the signals transmitted successively at step 330. Characteristics of the signal received at step 360 may be analyzed at this step including characteristics such as phase, frequency, and amplitude of the signal as well as its orthogonal components in the X, Y, and Z axes. For example, it may be determined whether the received signal is equal to the sum of the received successive signals at step 330 within a given tolerance specified by a technician or automatically specified. One or more of the following may be used to determine whether the signals are validated:

1. The length of the vector that represents the signal received at step 360 may be compared to the length of the vector representing the sum of the signals received at step 330. If the comparison shows that the lengths of these vectors are equal within a certain tolerance level (e.g., 5-10%) then the signals may be validated.

2. An angle between vectors that correspond to the signals transmitted successively at 320 (which may be considered an expected angle) may be compared to an angle calculated by comparing the signal received at step 360 to the signals received at step 330. For example, angle A1 of FIG. 2 may be determined through calculation based on the measurements of signal E1 and signal E2 and may be considered an expected angle. The expected angle A1 may be compared to a corresponding angle calculated from the signal received at step 360 (e.g., by comparing the signal received at step 360 to the signals received at step 330). If the angle calculated based on the signal received at step 360 is equal to the expected angle within a given tolerance (e.g., 5-10%) the signal received at step 360 may be validated.

3. Calculated angles between a vector representing one of the signals received at step 330 and the vector representing the sum of the signals received at step 330 may be compared to a corresponding angle calculated based on the signal received at step 360. For example, angles A2 and/or A3 of FIG. 2 may be determined based on signals E1 and E2 that may have been received at step 330. Angles A2 and A3 may be compared to corresponding angles calculated by comparing the signal received at step 360 with E1 and E2. If these angles are equivalent to each other within a given tolerance level (e.g., 5-10%) then the signal received at step 360 may be validated.

If it is determined that the signals received at 360 is validated, then step 390 may be performed; if it is determined that the signal received at step 360 is not validated, then step 380 may be performed.

At step 380, in some embodiments, the communication session may end. This may occur because the signal received at 360 may not have been validated. Determining that the signal is not validated at step 370 may indicate a suspicion that a relay attack has occurred (e.g., that signals are being relayed such that devices that are remote to one another may communicate as if they were in proximity of another). The communication session may be ended so that access may not be granted. For example, car CA may determine not to further communicate because it has determined that the signal received at step 360 was not validated. As another example, key KE may determine that the signal received at step 360 was not validated and end the communication session.

At step 390, in some embodiments, the communication session activated at step 310 may continue. For example, key KE may continue communication with car CA once it has been determined at step 370 that the signal received at step 360 was validated. This may indicate that a relay attack is not occurring. In some embodiments key KE may transmit one or more messages that includes authentication information to car CA in order to gain access or activate one or more features of car CA. The communication session may continue on a different frequency band than used in the preceding steps. For example, the signals transmitted in steps 320 and 350 may be transmitted in the kilohertz range while one or more subsequent transmissions that occur at step 390 may occur in the megahertz range. In some embodiments, key KE may send signals that cause car CA to unlock one or more doors to allow entry into car CA at this step.

In some embodiments, the steps discussed above may be performed iteratively or multiple times with different type of signals. For example, the signals transmitted at step 320 and step 350 may vary in multiple iterations such as varying the amplitude phase and/or frequency of the signals. In some embodiments, when performing validation at step 370, the results of previous iterations may be taken into account. For example, in order to perform the validation in step 370 it may be required that three iterations of validation occur with varying types of signals transmitted at step 320 and 350. This may provide for stronger protection from attacks such as relay attacks.

In some embodiments, additional steps may be performed. For example, U.S. Pat. No. 6,970,679 describes techniques to detect a relay attack that may be performed with the steps discussed above. One or more of the techniques discussed in U.S. Pat. No. 6,970,679 and may be evaluated at step 370. If those techniques indicate that a relay attack is occurring, then step 380 may be performed, otherwise step 390 may be performed as long as the signal received a step 360 has been validated. Other suitable additional steps may be performed.

Although several embodiments have been illustrated and described in detail, it will be recognized that modifications and substitutions are possible without departing from the spirit and scope of the appended claims. For example, while the embodiments discussed above are with regard to a communication session between a vehicle and a key (such as car CA and key KE of FIG. 1), the components and techniques discussed above with respect to FIGS. 1-3 may be used within other suitable contexts. As examples, the disclosure above may be applied in a communication session: between a computing device (such as a computer, smartphone, or tablet) and a peripheral; between a terminal used for financial transactions and an identification element (such as an ATM card or credit card); to unlock a door in a building; and to gain access to a locker.

What is claimed is:

1. A method comprising:

initiating a communication session with a device;

performing a first validation by comparing a first set of signals transmitted in series from antennas of the device to a second set of signals transmitted in parallel from the antennas and determining whether or not the second set of signals is validated based on a result of the comparing the first set of signals to the second set of signals;

determining, as a result of the first validation, that the second set of signals is validated based on a positive result of the comparing of the first set of signals to the second set of signals;

performing a second validation by using the result of the first validation, comparing a third set of signals transmitted in series from the antennas of the device to a fourth set of signals transmitted in parallel from the antennas, where the third set of signals is generated by varying a characteristic of the first set of signals, and determining whether or not the fourth set of signals is validated based on a result of the comparing the third set of signals to the fourth set of signals;

determining, as a result of the second validation, that the fourth set of signals is validated based on a positive result of the comparing of the third set of signals to the fourth set of signals; and maintaining the communication session with the device by using the result of the second validation.

2. The method of claim 1, further comprising:

receiving the first set of signals transmitted in series from the antennas;

determining a first reference signal based on the received first set of signals; and receiving the second set of signals transmitted in parallel from the antennas to obtain a first composite signal, wherein the determining whether or not the second set of signals is validated comprises determining whether the first composite signal comprises at least one characteristic that is substantially equal to at least one characteristic of the first reference signal within a specified tolerance level.

3. The method of claim 2, wherein the at least one characteristic of the first reference signal comprises at least one of: an amplitude, a frequency, a phase, and an angle.

4. The method of claim 1, further comprising:

receiving the third set of signals transmitted in series from the antennas;

determining a second reference signal based on the received third set of signals; and receiving the fourth set of signals transmitted in parallel from the antennas to obtain a second composite signal, wherein the determining whether or not the fourth set of signals is validated comprises determining whether the second composite signal includes at least one characteristic that is substantially equal to at least one characteristic of the second reference signal within a specified tolerance level.

5. The method of claim 4, wherein the at least one characteristic of the second reference signal comprises at least one of: an amplitude, a frequency, a phase, and an angle.

6. The method of claim 1, wherein the first set of signals comprises a first signal transmitted from a first antenna of the antennas and a second signal transmitted from the second antenna of the antennas that are transmitted in series, and the second set of signals comprises the first signal from the first antenna and the second signal from the second antenna that are transmitted in parallel, and wherein the third set of signals comprises a third signal from the first antenna and a fourth signal from the second antenna that are transmitted in series, and the fourth set of signals comprises the third signal from the first antenna and the fourth signal from the second antenna that are transmitted in parallel.

7. The method of claim 6, wherein the third signal is generated by varying a characteristic of the first signal.

8. The method of claim 7, wherein the third signal comprises a phase shift of the first signal.

9. The method of claim 7, wherein the third signal comprises a modification of an amplitude of the first signal.

10. The method of claim 7, wherein the third signal comprises a frequency change of the first signal.

11. The method of claim 6, wherein the fourth signal is generated by varying a characteristic of the second signal.

12. The method of claim 6, further comprising determining a second reference signal based on the third signal and the fourth signal by combining the third signal and the fourth signal.

13. The method of claim 6, wherein the third set of signals comprises at least one of a variation of the first signal and a variation of the second signal.

14. A system comprising:

at least one antenna operable to:

receive a first set of signals transmitted in series from antennas of a device;

receive a second set of signals transmitted in parallel from the antennas;

receive a third set of signals transmitted in series from the antennas, the third set of signals being generated by varying a characteristic of the first set of signals; and receive a fourth set of signals transmitted in parallel from the antennas; and at least one processor configured to:

initiate a communication session with the device;

perform a first validation by comparing the received first set of signals to the received second set of signals, and determining whether or not the received second set of signals is validated based on a result of the comparing the received first set of signals to the received second set of signals;

determine, as a result of the first validation, that the received second set of signals is validated based on a positive result of the comparing of the received first set of signals to the received second set of signals;

perform a second validation by using the result of the first validation, comparing the received third set of signals to the received fourth set of signals, and determining whether or not the received fourth set of signals is validated based on a result of the comparing the received third set of signals to the received fourth set of signals;

determine, as a result of the second validation, that the received fourth set of signals is validated based on a positive result of the comparing of the received third set of signals to the received fourth set of signals; and maintain the communication session with the device by using the result of the second validation.

15. The system of claim 14, wherein the at least one processor is configured to determine a first reference signal based on the received first set of signals, wherein the at least one antenna is operable to receive the second set of signals transmitted in parallel from the antennas to obtain a first composite signal, and wherein the at least one processor is configured to determine whether or not that the received second set of signals is validated by determining whether the first composite signal comprises at least one characteristic that is substantially equal to at least one characteristic of the first reference signal within a specified tolerance level.

16. The system of claim 15, wherein the at least one characteristic of the first reference signal comprises at least one of: an amplitude, a frequency, a phase, and an angle.

17. The system of claim 14, wherein the first set of signals comprises a first signal transmitted from a first antenna of the antennas and a second signal transmitted from the second antenna of the antennas that are transmitted in series, and the second set of signals comprises the first signal from the first antenna and the second signal from the second antenna that are transmitted in parallel, and wherein the third set of signals comprises a third signal from the first antenna and a fourth signal from the second antenna that are transmitted in series, and the fourth set of signals comprises the third signal from the first antenna and the fourth signal from the second antenna that are transmitted in parallel.

18. The system of claim 17, wherein the third signal is generated by varying a characteristic of the first signal.

19. The system of claim 18, wherein the third signal comprises a phase shift of the first signal.

20. The system of claim 18, wherein the third signal comprises a modification of an amplitude of the first signal.

21. The system of claim 18, wherein the third signal comprises a frequency change of the first signal.

22. The system of claim 17, wherein the fourth signal is generated by varying a characteristic of the second signal.

23. The system of claim 17, wherein the at least one processor is configured to determine a second reference signal based on the third signal and the fourth signal by combining the third signal and the fourth signal.

24. The system of claim 23, wherein the third set of signals comprises at least one of a variation of the first signal and a variation of the second signal.

25. The system of claim 14, wherein determining that the fourth set of signals is validated comprises determining that a second composite signal obtained from the fourth set of signals comprises at least one characteristic that is substantially equal to at least one characteristic of a second reference signal within a specified tolerance level, the second reference signal being determined based on the received third set of signals.

26. The system of claim 25, wherein the at least one characteristic of the second reference signal comprises at least one of: an amplitude, a frequency, a phase, and an angle.

27. One or more computer-readable non-transitory storage media embodying logic that is configured when executed to:

initiate a communication session with a device;
perform a first validation by comparing a first set of signals transmitted in series from antennas of the device to a second set of signals transmitted in parallel from the antennas and determining whether or not the second set of signals is validated based on a result of the comparing the first set of signals to the second set of signals;

determining, as a result of the first validation, that the second set of signals is validated based on a positive result of the comparing of the first set of signals to the second set of signals;

perform a second validation by using the result of the first validation, comparing a third set of signals transmitted in series from the antennas of the device to a fourth set of signals transmitted in parallel from the antennas, where the third set of signals is generated by varying a characteristic of the first set of signals, and determining whether or not the fourth set of signals is validated based on a result of the comparing the third set of signals to the fourth set of signals;

determining, as a result of the second validation, that the fourth set of signals is validated based on a positive result of the comparing of the third set of signals to the fourth set of signals; and maintain the communication session with the device by using the result of the second validation.

28. The media of claim 27, wherein the logic is further configured when executed to:

receive the first set of signals transmitted in series from the antennas;
determine a first reference signal based on the received first set of signals; and
receive the second set of signals transmitted in parallel from the antennas to obtain a first composite signal,
wherein the determining whether or not the second set of signals is validated comprises determining whether the first composite signal comprises at least one characteristic that is substantially equal to at least one characteristic of the first reference signal within a specified tolerance level.

29. The media of claim 28, wherein the at least one characteristic of the first reference signal comprises at least one of: an amplitude, a frequency, a phase, and an angle.

30. The media of claim 27, wherein the logic is further configured when executed to:

receive the third set of signals transmitted in series from the antennas;
determine a second reference signal based on the received third set of signals; and
receive the fourth set of signals transmitted in parallel from the antennas to obtain a second composite signal,
wherein the determining whether or not the fourth set of signals is validated comprises determining whether the second composite signal comprises at least one characteristic that is substantially equal to at least one characteristic of the second reference signal within a specified tolerance level.

31. The media of claim 30, wherein the at least one characteristic of the second reference signal comprises at least one of: an amplitude, a frequency, a phase, and an angle.

32. The media of claim 27, wherein the first set of signals comprises a first signal transmitted from a first antenna of the antennas and a second signal transmitted from the second antenna of the antennas that are transmitted in series, and the second set of signals comprises the first signal from the first antenna and the second signal from the second antenna that are transmitted in parallel, and wherein the third set of signals comprises a third signal from the first antenna and a fourth signal from the second antenna that are transmitted in series, and the fourth set of signals comprises the third signal from the first antenna and the fourth signal from the second antenna that are transmitted in parallel.

33. The media of claim 32, wherein the third signal is generated by varying a characteristic of the first signal.

34. The media of claim 33, wherein the third signal comprises a phase shift of the first signal.

35. The media of claim 33, wherein the third signal comprises a modification of an amplitude of the first signal.

36. The media of claim 33, wherein the third signal comprises a frequency change of the first signal.

37. The media of claim 32, wherein the fourth signal is generated by varying a characteristic of the second signal.

38. The media of claim 32, wherein the logic is further configured when executed to: determine a second reference signal based on the third signal and the fourth signal by combining the third signal and the fourth signal.

39. The media of claim 38, wherein the third set of signals comprises at least one of a variation of the first signal and a variation of the second signal.

* * * * *